United States Patent [19]

Peters

[11] 4,110,724
[45] Aug. 29, 1978

[54] APPARATUS FOR TRANSMISSION OF MESSAGES BY MEANS OF ELECTROMAGNETIC WAVES

[75] Inventor: Johannes Peters, Deisenhofen near Munich, Fed. Rep. of Germany

[73] Assignee: Bolkow Gesellschaft mit beschrankter Haftung, Ottobrunn, Fed. Rep. of Germany

[21] Appl. No.: 378,077

[22] Filed: Jun. 25, 1964

[51] Int. Cl.² ............................................. H04B 1/034
[52] U.S. Cl. ..................................... 340/4 A; 325/112; 325/115; 325/116; 343/707; 343/709; 340/2
[58] Field of Search .................................. 343/705–707, 343/709, 717, 843, 877, 878, 880; 325/112–116; 9/8; 244/1, 1 R, 1 TD, 142, 147; 340/2, 4, 5, 4 A, 343; 102/34.1, 34.4; 89/1.34

[56] References Cited

U.S. PATENT DOCUMENTS

| 3,118,638 | 1/1964 | Rohr | 102/34.1 X |
| 3,156,185 | 11/1964 | Hermann et al. | 102/1 |
| 3,171,128 | 2/1965 | Shattuck | 343/706 |
| 3,273,153 | 9/1966 | Icenbice, Jr. | 343/706 |
| 3,277,429 | 10/1966 | Hammond, Jr. | 340/2 |

FOREIGN PATENT DOCUMENTS 411,312  6/1934  United Kingdom ................... 340/4 A

*Primary Examiner*—Richard A. Farley
*Attorney, Agent, or Firm*—Toren, McGeady and Stanger

EXEMPLARY CLAIM

1. Apparatus for long-range transmissions of messages by means of electromagnetic waves, comprising a long-wave transmitting plant including a message-storing unit, a transmitter, an antenna whose length equals a quarter length of the emitted waves or a multiple thereof, and a missile for hoisting said antenna, a parachute detachably connected to said missile, an elastic cord, said parachute being connected to said antenna by means of said elastic cord, said elastic cord being dimensioned in accordance with the required antenna dimensions and transmission time.

7 Claims, 4 Drawing Figures

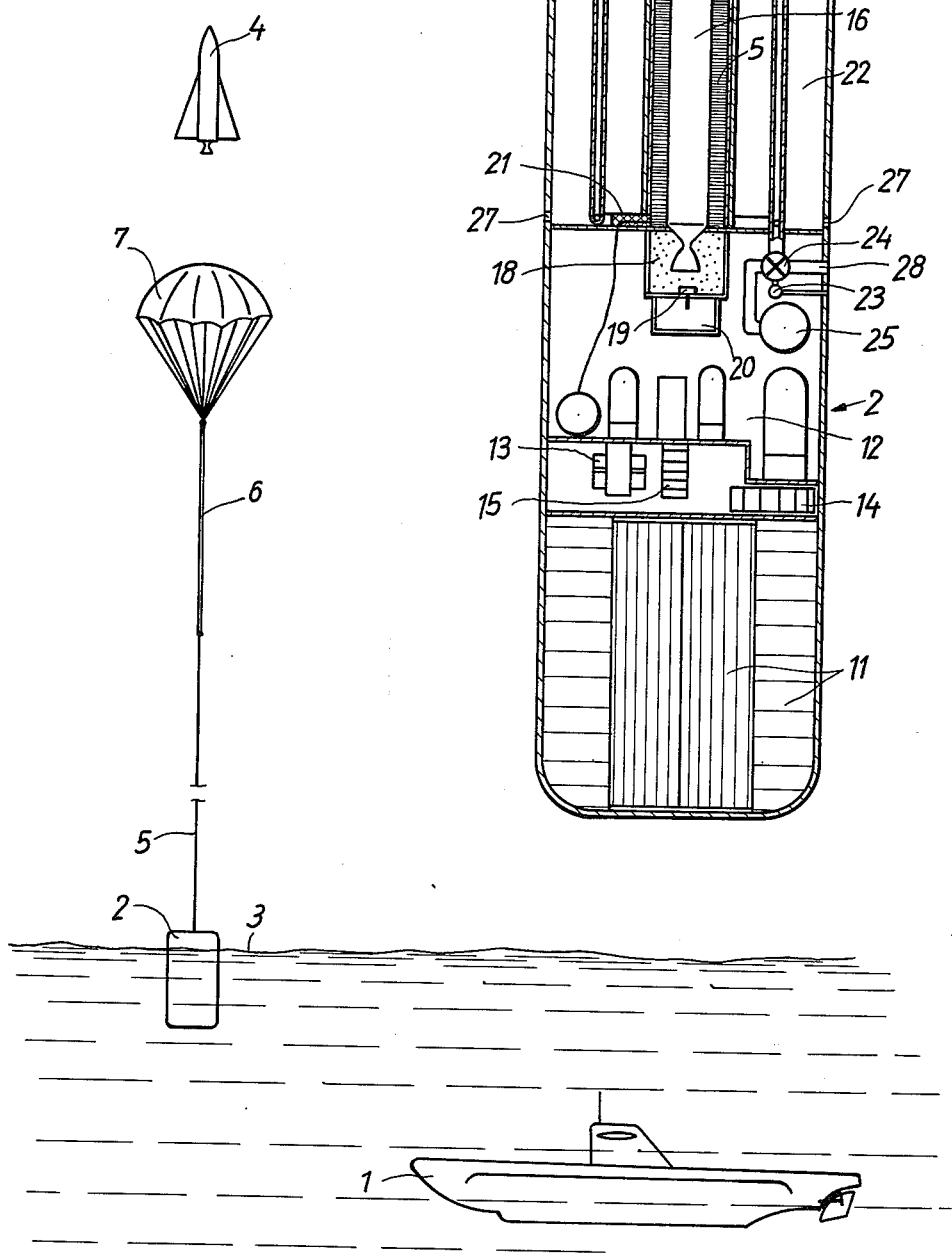

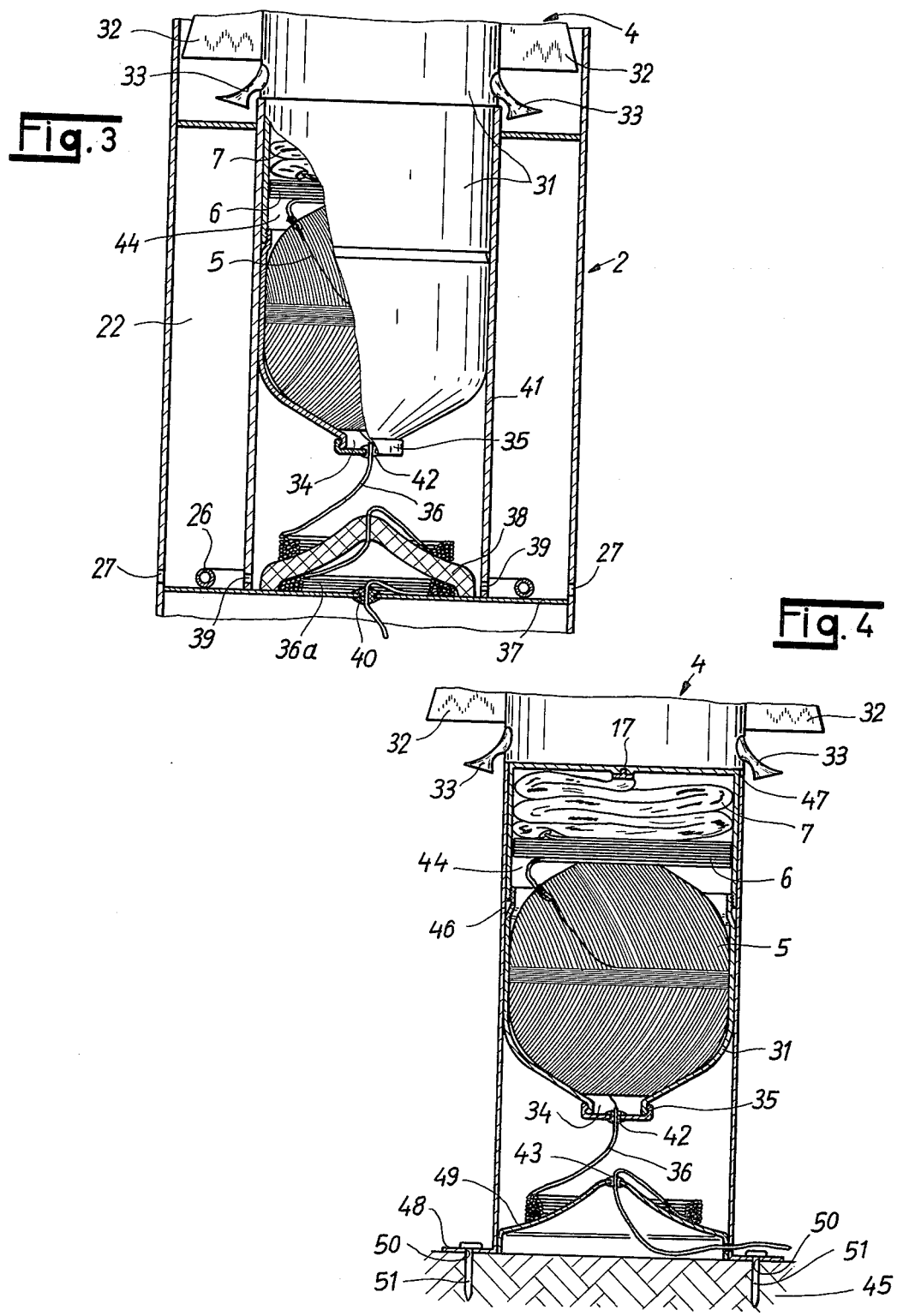

APPARATUS FOR TRANSMISSION OF MESSAGES BY MEANS OF ELECTROMAGNETIC WAVES

This invention relates to means for transmitting messages by means of electromagnetic waves.

The problem of providing instantaneously an antenna for the transmission of messages by means of electromagnetic waves has not yet been solved in many cases, such as transmission from submarines. The known method of hoisting an antenna with the aid of balloons is very slow, so that often an unduly long time elapses between the wish to transmit a message and the possibility to do so. Furthermore, the propagation properties of long electromagnetic waves, which is favorable to long-distance communications, could be utilized until now only very insufficiently, for the effective antenna lengths of a quarter of the wavelength, or a multiple thereof, which is necessary for satisfactory utilization of long-wave antennas, have not been realized at the present state of technology. If, for instance, the transmission had to be effected at a frequency of 32.8 kilocycles, which corresponds to a wavelength of 30,000 ft, a vertically hoisted antenna of a length of 7,500 ft would be required on principle.

The rapid erection of an antenna of the aforesaid length has been impossible with the means known hitherto. In the case of stationary ground stations, the mounting of antenna towers of said height is out of question for the bare reason of cost.

In a range of applications, military as well as civil, as, for instance, emergency calls, the transmitter operation time is in the order of seconds. This applies particularly to underwater installations, such as submerged submarines, which transmit messages to installations above the water surface by releasing a message-storing transmitter unit mounted in a container into water or to the water surface at least for the duration of a transmission.

It is an object of the present invention to provide a momentary long-range channel of communication which differs advantageously from known systems.

In accordance with this invention there is provided a long-wave transmitting plant comprising a message-storing unit, a transmitter, an antenna whose length equals a quarter length of the emitted wave, or a multiple thereof, and a preferably rocket-propelled missile for hoisting the antenna, detachably connected to a parachute, said antenna being attached to the parachute by a rubber-elastic cord dimensioned in accordance with the dimensions of the antenna and the time of transmission.

The very long antenna necessary for a long-wave transmitting plant is available for the transmission of the intended message in the shortest time possible by using a rocket-propelled missile for hoisting the antenna.

The folded parachute together with the rubber-elastic cord and the coiled up antenna are advantageously mounted in the fuselage of the missile and can be released through its rear part.

The parachute in combination with the rubber-elastic cord is designed to prevent the antenna wire from dropping instantly due to the effect of gravity upon termination of the accelerated ascent of the missile, and thus to extend the available transmission time. Furtheremore, after the antenna is uncoiled, the rubber-elastic cord will be uncoiled and due to the effect of the accelerated ascent of the missile stretched to the permissible limit, after which the parachute is pulled out of the fuselage, detached from the missile, and unfolded. Now the unfolded parachute together with the rubber-elastic cord will keep the antenna vertical until the shortening of the rubber-elastic cord following the descent of the parachute reduces the force which results from the stretching of the rubber-elastic cord in such a way that it becomes insufficient to carry the whole antenna. Thus the available transmission time is mainly determined by the size and the descending velocity of the parachute, respectively, as well as by the spring elongation and the spring rate of the elastic cord.

Another feature of the invention is to interweave the rubber-elastic cord with metal strand.

According to another feature of the invention, the shroud lines, and eventually the parachute canopy, are interwoven with metal in order to provide an endload capacity.

These measures give a still greater effective antenna length, or otherwise the actual antenna wire may be made correspondingly shorter. Standard antenna wire of high stength may be used as antenna material. Its cross section is adequate for keeping small the electrical resistance losses in the antenna wire as well as for resisting the mechanical stresses.

However, the hoisting of such an antenna vertically upward must be carried out in such a way that it neither breaks because of a too strong pull nor runs out of the fuselage due to the weight of the already uncoiled wire portion in case of a too weak pull. In this case the wire would fall down to the ground too early. Thus the required uncoiling force plus the friction forces occurring in the process of uncoiling must be just a little greater than the weight of the already uncoiled antenna hanging down. The friction during the uncoiling is small, particularly when the coil is a coreless one, so that the uncoiling of the antenna wire starts from the inside of the antenna coil.

According to another feature of the invention the engine propelling the missile is so designed that, with the friction neglected, the missile moves upward at a constant acceleration whose amount slightly exceeds half the acceleration due to gravity. This acceleration program ensures a proper paying-out of the antenna, for the tension stress per antenna cross section during paying-out remains constant in time.

Another feature of the invention is to provide a cover for closing the pay-out aperture of the fuselage, with the antenna attached to the inside of this cover and a connection cable between the transmitter and the antenna attached to the outside of said cover.

The cover is removed from the fuselage after launching by means of the anchored connection cable. Thus this cover prevents an unintended uncoiling of the antenna wire.

Another feature of the invention is to achieve for channels of communication from submerged stations for a sure, i.e. a vertical launching of the antenna-hoisting missile out of a swimming or suspended container, a stable position thereof. Such a stable position exists when the center of mass of the container together with its contents is located below the center of buoyancy of the container. This is achieved by mounting inside the upper portion of the container a flooding and deflooding float controlled by a depth regulator, and the missile that is not heavy by itself; inside the middle portion of the container the light-weight transmitter with the auxiliary equipment, and in the bottom portion a storage battery, that is known to be heavy, for the current supply of the transmitting plant.

Underwater launching of the missile is particularly advantageous at a heavy sea. In this case the direction of the missile can be affected by the waves only at the moment of its emerging from the water. Such deviations can be prevented by a gyroscope.

Another feature of the invention is the provision of a swimmer for anchoring the antenna, the swimmer bearing a cable or a portion of it, which connects the antenna to the transmitter.

The swimmer is attached to such a point of the connection cable that the connection cable portion below the swimmer is longer than the submersion depth of the container. At the moment of launching, the swimmer surfaces from the launching depth, whilst the container comprising the transmitter and auxiliary equipment and being controlled by the depth regulator stays in the launching depth. By the mentioned arrangement of the swimmer and connection cable the position of the container remains unaffected by rough sea and the antenna-hoisting process during which the swimmer might be pulled out of the water.

A further advantage of the invention is that the antennas of several thousand feet height thus realized are not only useful for an effective wave propagation in the atmosphere and the space, but also underneath the water surface. This may be utilized by submerged submarines for checking their own transmission.

According to another feature of the invention the container also contains a receiver. This may be used to receive a message, for instance the reply to the message that has been transmitted. In this case the incoming message caught by the available antenna is transmitted via the receiver to the message-storing unit and is thereafter emitted again by the long-wave transmitter via the antenna. The favorable propagation conditions of long waves below the water surface make it possible for a submerged submarine to receive the re-emitted message, similarly to the above described checking of own transmissions.

A further feature is to provide a second transmitter in the container, emitting a high-frequency sound wave, in particular an ultrashort sound wave. In this case, a message taken up by the receiver is re-emitted by the second transmitter and thus receivable by submerged submarine. Thus the container includes, in addition to the first transmitter, a transducer for translation of signals coming in through the air into underwater signals. A further advantage of this arrangement is that the messages must not necessarily be emitted via the message-storing unit provided in the container, for a wireless transmission way may rather be used for emitting messages from a submerged submarine to the container.

The various features of novelty which characterize the invention are pointed out with particularity in the claims annexed to and forming a part of this specification.

For a better understanding of the invention, its operating advantages and specific objects attained by its use, reference should be made to the accompanying drawings and descriptive matter in which there are illustrated and described the preferred embodiments of the invention.

In the drawings:

FIG. 1 is a general view of the long-wave transmitting plant with the hoisted antenna, FIG. 2 is a swimmable and suspendable container containing the transmitting plant, FIG. 3 is a modification of the antenna-hoisting missile combined with a container as shown in FIG. 2, FIG. 4 is an antenna-hoisting missile as shown in FIG. 3, combined with a launching support for use on solid ground.

Referring to the drawings in particular, the invention embodied therein includes, as FIG. 1 shows, a submerged submarine 1 which has released a swimmable and suspendable container 2 from aboard to the water surface 3 in order to transmit a message. This container 2 comprises a transmitter, here not shown in detail, with the auxiliary equipment. The missile 4, launched from this container 2, has first uncoiled the antenna 5 which is anchored to the container 2, and thereafter the rubber-elastic cord 6, that is attached to the antenna 5, whereby the cord 6 has been stretched to the permissible limit. Thereafter a parachute 7 has been pulled out of the missile 4, detached from it and unfolded. The unfolded parachute 7 in connection with the rubber-elastic cord 6 is now keeping the antenna 5 vertical until the shortening of the cord 6 following the descent of the parachute reduces the force which results from the stretching of the cord in such a way that it becomes insufficient to carry the entire antenna 5. Thus the available transmission time is mainly determined by the size and the descending velocity of the parachute 7, respectively, as well as by the spring elongation and the spring rate of the rubber-elastic cord 6.

If, for instance, the velocity of the missile 4 at the beginning of uncoiling the rubber-elastic cord 6 is 420 ft/s, and the uncoiling and stretching of the cord 6 causes a deceleration of 90 ft/s$^2$ of the missile 4, then, if the unstretched length of 240 ft cord is being stretched 500%, 5 seconds will elapse before the parachute 7 is detached from the missile 4 and unfolded, and this time will be already available for transmission. If the parachute thereafter descends at a velocity of 15 ft/s, and the antenna 5 starts collapsing at a 125% stretching of the cord 6, then the available transmission time is increased by another 60 seconds.

FIG. 2 shows in detail the contents of the container. The bottom portion of the container 2 contains a storage battery 11 for the electric power supply of an above-placed transmitter 12, a transducer 13, a modulator 14, and a message-storing unit 15. The top portion of the container 2 contains the rocket-propelled missile 4 with the antenna 5 to be hoisted and the rubber-elastic cord 6, both coiled up and placed inside, the coil core serving at the same time as the housing of the solid-propellant rocket 16. Above the latter, in the nose cone of missile 4, the parachute 7 is mounted and connected through its shroud lines (not shown) to the cord 6, whilst the apex of its canopy is detachably connected to the missile by means of a push-button connection 17. The launching of the missile is effected by a launching charge 18 whose ignition point is controlled by a timing apparatus 20 acting on a fuse 19. The determined launching moment can thus be timed aboard the submarine 1 before the container 2 is released into water. The ignition of the launching charge 18, which before its combustion-cutoff ignites the solid-propelled rocket, is, as well as the drive of the timing apparatus 20, energized with electric power by the storage battery 11. The bottom end of the antenna 5 is attached to the container 2 by means of an adhesie mass 21.

Furthermore, FIG. 2 shows a floodable and defloodable float 22. By means of this float 22 the container 2 can be kept in the desired depth. The flooding and deflooding is controlled by a depth regulator 23 permitting adjustments of the determined submersion depth which corresponds to a certain water pressure. If the submersion depth if insufficient, which corresponds to an insufficient water pressure, a three-way valve 24 is set by the depth regulator 23 into a position as to let compressed air flow from an air supply tank 25 through the three-way valve 24, which will due to its corresponding design produce a suction causing the air in the float 22 to flow out through conduits 26, whereby the float is flooded through openings 27. Compressed air and the sucked-off air leave the container 2 through outlet conduits 28. At an excessive submersion depth, corresponding to an excessive water pressure, compressed air from the air supply tank 25 flows via the three-way valve 24, which has been set into the second position by the depth regulator 23, through the conduits 26 into the float 22, thus de-flooding the latter.

FIG. 3 shows a modification of the antenna hoisting rocket-propelled missile 4, combined with a container as shown in FIG. 2.

The nozzles of the solid-propellant rocket are located below two guide vanes 32 diametrically mounted on the fuselage 31 of the missile 4.

A further compartment 44 of the fuselage 31, which is situated below the rocket, contains the detachable parachute 7, the rubber-elastic cord 6 connected to said parachute, and the antenna 5 tied to said rubber-elastic cord 6. In order to minimize the friction during the uncoiling process of the antenna 5, the latter is a coreless one, so that the uncoiling of the antenna wire starts from inside of the antenna coil. A cover 35 is provided for closing the aperture 34. The antenna 5 is attached to the inside of the cover 35, whilst a connection cable 36 provided between the transmitter and the antenna 5 is attached to the outside of said cover 35. After launching, the cover 35 is removed from the fuselage 31 by the connection cable 36, one end of which is attached to the cover by a first clamp 42 whilst the other end is connected by means of a second clamp 40 to a partition wall 37 of the container 2. A swimmer 38 serving as an anchor for the antenna 5 is used for underwater launching of the missile. The swimmer 38 is attached to the connection cable 36 on such a point that the length 36a of this cable below the swimmer 38 exceeds the determined submersion depth of the container 2. At the moment of launching the swimmer 38 emerges, supported by the water entering through openings 27 and 39. The container 2, controlled by the depth regulator (not shown), stays in the launching depth. A tube 41 serves for guiding the missile during the first phase of launching. This tube at the other hand constitutes the inner wall of the float 22.

FIG. 4 shows the same missile 4 as shown in FIG. 3, but with a launching support designed for launchings from a solid surface 45, such as ships or ground stations. This launching support consists of a tube 46 on whose top end the missile 4 rests on ledge 47, a flange 48 that is connected to the bottom end of the tube 46, and a bottom 49 which closes the tube 46 from below. The flange 48 is provided with bores 50, which enables for instance in connection with pegs 51, the fixing of the launching support on solid surface. The inward domed bottom 49 serves as a hold for the connection cable 36. The bottom anchorage 43 of the connection cable 36 is placed in the centre of the bottom 49. From there it further reaches through the bottom 49 and the tube 46 to the transmitter 12 (not shown).

What is claimed is:

1. Apparatus for long-range transmissions of messages by means of electromagnetic waves, comprising a long-wave transmitting plant including a message-storing unit, a transmitter, an antenna whose length equals a quarter length of the emitted waves or a multiple thereof, and a missile for hoisting said antenna, a parachute detachably connected to said missile, an elastic cord, said parachute being connected to said antenna by means of said elastic cord, said elastic cord being dimensioned in accordance with the required antenna dimensions and transmission time.

2. An apparatus according to claim 1, characterized in that the propelled ascending motion of the missile progresses at a constant acceleration due to the design of its propelling system, the amount of the acceleration slightly exceeding half the acceleration due to gravity.

3. An apparatus according to claim 1, characterized in that said missile includes a fuselage, a cover for said fuselage, said antenna being attached to the inside of said cover, and a connection cable provided between the transmitter and said antenna attached to the outside of said cover, said cover being removable from the fuselage after launching of the missile.

4. An apparatus according to claim 1, including a swimmer serving as an anchor for the antenna, said swimmer carrying a connection cable, said connection cable being connected to said swimmer on such a point that the length of said connection cable below said swimmer exceeds the submersion depth of the container in which depth the missile is launched.

5. An apparatus according to claim 1, wherein said parachute is folded within said missile, said antenna being coiled within said missile in a position in which it may be extracted therefrom.

6. An apparatus according to claim 1, including a container for said long-wave transmitting plant, said container having an upper portion housing said missile, an intermediate portion housing said transmitter and said message storing unit, and a bottom portion housing a storage battery for the current supply of said transmitting plant, a storage battery for operating said transmitting plant, and a floating chamber defined in said container for receiving and dicharging sea water in order to float said apparatus in water at a selected depth.

7. A device for transmitting radio signals comprising a housing, a self-propelled missile within said housing, means for firing said missile, an antenna stored in said housing and connected to said missile and being raised upwardly by the firing of said missile and a parachute connected to said antenna being openable upon the erection of said antenna upon the firing of said missile for supporting said antenna in an erected condition for a period of time.

* * * * *

UNITED STATES PATENT OFFICE
CERTIFICATE OF CORRECTION

Patent No. 4,110,724          Dated   August 29, 1978

Inventor(s) Johannes Peters

It is certified that error appears in the above-identified patent and that said Letters Patent are hereby corrected as shown below:

In the heading of the Patent [30] should read as follows:

[30] Foreign Application Priority Data

Germany..........June 25, 1963 ....  14 41 574
                 formerly (B 72 413 Ixd/21 a 4)

Signed and Sealed this

Sixth Day of March 1979

[SEAL]

Attest:

RUTH C. MASON  
Attesting Officer

DONALD W. BANNER  
Commissioner of Patents and Trademarks